3,479,311
PRESSURE-SENSITIVE CHLOROPRENE POLYMER ADHESIVES
John Joseph Gorman, Hockessin, Del., assignor to E. I. du Pont de Nemours and Company, Wilmington, Del., a corporation of Delaware
No Drawing. Continuation-in-part of application Ser. No. 611,573, Jan. 25, 1967. This application Jan. 3, 1968, Ser. No. 695,350
Int. Cl. C08g *51/24;* C09d *5/02*
U.S. Cl. 260—29.3          8 Claims

ABSTRACT OF THE DISCLOSURE

Preparation of pressure-sensitive adhesive from chloroprene polymers of 0.1 to 2 wt. percent sulfur, a monomer such as $CH_2=CR-COOH$ in amounts to provide 0.25 to 1 wt. percent —COOH groups and another monomer such as 2,3-dichloro-1,3-butadiene, by peptizing the polymer in a 10 to 60 wt. percent solution in a hydrocarbon/ketone solvent (e.g., toluene, MEK and hexane) with about $7 \times 10^{-5}$ to $3 \times 10^{-2}$ moles per 100 parts of polymer, of a mercapto acid (e.g., about 0.01 to 4 phr. 3-mercaptopropionic acid or thiomalic acid) and a water/lower alkyl alcohol viscosity stabilizing system, with subsequent addition of 0.1 to 20 phr. of MgO and a tackifying resin. Excellent creep resistance and adequate "quick stick" properties are obtained without resorting to a heat cure.

CROSS-REFERENCE TO RELATED APPLICATION

This application is a continuation-in-part of applicant's copending application Ser. No. 611,573, filed January 25, 1967 now abandoned.

BACKGROUND OF THE INVENTION

Field of the invention.—This invention relates to pressure-sensitive adhesives and, more particularly, to their preparation by peptizing carboxyl-containing chloroprene-sulfur copolymers.

Description of the prior art.—Chloroprene polymers have been used to prepare pressure-sensitive adhesives. Some have not been curable at room temperature while others did not exhibit sufficient crystallization resistance. Many also exhibit objectionably high solution viscosities. Generally, the attempts made to overcome the problem of resistance to low temperature cure have resulted in gellation of the solvent-based pressure-sensitive adhesive systems employed. Virtually all conventional chloroprene polymer recipes include a combination of zinc oxide and magnesium oxide as curing agents and acid acceptor. However, when the chloroprene polymer is carboxyl-containing, the use of zinc and magnesium oxides together causes overcure with resultant loss of "quick stick" properties.

SUMMARY OF THE INVENTION

In the preparation of pressure-sensitive adhesives from a carboxyl-containing chloroprene-sulfur copolymer having about 0.25 to 1 (preferably 0.25 to 0.6) weight percent carboxyl groups, and 0.1 to 2 (preferably 0.4 to 0.8) weight percent sulfur, the improvement of peptizing 100 weight parts of said polymer by adding (a) a solvent system containing hydrocarbon solvents and ketone or ester solvents, in amounts to produce about a 10 to 60 weight percent solution of the polymer, (b) a mercapto acid in amounts of about $7 \times 10^{-5}$ to $3 \times 10^{-2}$ (preferably $3.5 \times 10^{-4}$ to $2 \times 10^{-2}$) moles and (c) a water-volatile alcohol viscosity stabilizing system in amounts sufficient to prevent gellation but not exceed the solubility parameter for the polymer in the solvent system, and after peptizing adding about 0.1 to 20 (preferably 1 to 10) parts of magnesium oxide and up to 200 parts of a tackifying resin.

DESCRIPTION OF PREFERRED EMBODIMENTS

The carboxyl-containing chloroprene polymers used must contain sulfur copolymerized into the polymer to provide the polysulfide linkages for peptization. The sulfur percentages in the copolymer refer to the sulfur present during polymerization as a percent of total monomers plus sulfur. In general, sulfur-chloroprene copolymerization is known; see Whitby, "Synthetic Rubber" (1954), page 770.

It is also essential that the chloroprene polymer contain carboxyl units. These are incorporated by polymerizing the chloroprene with a carboxyl-containing monomer such as $CH_2=CR-COOH$ where R is hydrogen or $C_1$ to $C_4$ alkyl. Methacrylic and acrylic acids are preferred. An especially complete teaching of preparing carboxyl-containing chloroprene polymers appear in assignee's U.S. application of Garrett, Ser. No. 411,705, filed Nov. 17, 1964.

The chloroprene polymer can have up to about 50 mole percent of the chloroprene units replaced by units of another ethylenically unsaturated monomer, free of carboxyl groups, copolymerizable with chloroprene. Representative monomers are 2,3-dichloro-1,3-butadiene, acrylonitrile, methyl methacrylate, styrene, vinyl chloride, vinylidene chloride, etc.

Particularly suitable for use in this invention are the carboxyl-containing chloroprene-sulfur copolymers of assignee's U.S. patent application of John F. Smith bearing U.S. Ser. No. 691,172 filed Dec. 18, 1967, which disclosure is specifically incorporated herein by reference.

The preferred solvent systems for this invention are those employing aromatic solvents like toluene, benzene or xylene with a ketone like methyl ethyl ketone or an ester like ethyl acetate. Other solvents like hexane, cyclohexane, naphthas or other volatile paraffinic hydrocarbons can be present in amounts up to about one-third by volume of the total solvent. The important thing about the solvent system is that it be a good one for the polymer employed.

The mercapto acid must be free of other mercaptan groups. Typical are 3-mercaptopropionic acid, thiomalic acid, and thioglycolic acid and those of the formula HS—R—COOH where R is alkylene. Chain length or molecular weight is not especially important unless it is such that interferes with the primary function of the mercapto acid; however, mercapto acids of about 2 to 15 carbon atoms are preferred. As the use of thiomalic acid shows, the mercapto acid may have more than one —COOH group.

The water-volatile alcohol stabilizing system preferably employs a $C_1$ to $C_4$ alkyl such as isopropyl alcohol, ethanol, etc. The boiling point is below that of the solvent system. It is preferred to employ an alcohol to water mole ratio of about 4 to 3.

The peptization of the polymer can take place at room temperature for periods of about 16 hours. Time and temperature are only important insofar as they be sufficient to permit peptization to occur. This is evidenced by a rapid drop in viscosity.

The tackifying resins are those well known to those in the art for use in pressure-sentitive adhesives. See for example Little, U.S. Patent 2,382,731.

The invention will now be described with reference to the following example thereof wherein parts and percentages are by weight unless otherwise indicated and "phr." means parts per 100 parts of chloroprene polymer.

Example

A copolymer is selected containing about 92.4 parts chloroprene, 5 parts of 2,3-dichloro-1,3-butadiene, 0.6 part of methacrylic acid and 0.6 part of sulfur. The Mooney viscosity (ML–4/212° F.) is about 55. This polymer can be prepared in the manner described in Example II of assignee's U.S. application of John F. Smith (referred to above).

About 100 parts of the copolymer are charged to a churn to which is simultaneously added about 268 parts of a solvent mixture of equal volumes of toluene, hexane and methyl ethyl ketone, 26 parts of 99% isopropanol with 6 parts of water, and 1.5 parts of 3-mercaptopropionic acid. The churn is agitated for about 16 hours at room temperature.

After this time, 4 parts of magnesium oxide and 2 parts of the antioxidant 2,2'-methylene-bis-(4-methyl-6-tert. butyl phenol) are added and dispersed for about 10 minutes. Thereafter about 40 parts of an oil-soluble, thermoplastic terpene-phenolic tackifying resin are added and stirred for about one hour.

The pressure-sensitive adhesive obtained is cast with a knife coater on a 1.5 mil polyethylene terephthalate ("Mylar") film to a thickness of about 10 wet mils (dries to about 2±0.2 mils). After about 24 hours at room temperature the adhesive is tested for its tack or "quick stick" property and creep resistance. To measure "quick stick," a 1 inch x 5 inch specimen is looped in a teardrop shape with the adhesive on the outside and placed in the upper jaws of an Instron tester; positioned horizontally on the lower jaw is a 2 inch x 6 inch polished stainless-steel plate. The plate is brought into contact with the specimen at a rate of 50 inches/minute until there is a ½ inch clearance between the upper jaw and the plate. Immediately, the machine is reversed at 12 inches per minute, and the maximum force in pounds per inch of specimen width is recorded.

Typically, the above adhesive exhibits "quick stick" adhesion values of about 1 lb./in. of width. If ZnO is employed in the above example, "quick stick" properties will be drastically reduced. After 2 weeks at 70° C. there is no appreciable loss in "quick stick" property.

The adhesive prepared as above is also found to be highly creep-resistant as determined by a modified Shear Adhesion Test PSPC–2 of the Pressure Sensitive Tape Council (Glenview, Ill.) as follows: A 1 inch x 5 inch specimen is fixed to a metal plate so that an area 0.5 square inch is covered on the plate. The plate is then placed on the test rack which is located in a 70° C. oven and a load of 1000 grams is attached. The timer is then actuated and the hours for the specimen to completely fail is measured.

The following comparison demonstrates the improvement obtained in creep resistance by using mercapto acids as peptizing agents. The same adhesive formulation is used in throughout except for varying the type of peptizing agent. Approximately equivalent molar quantities about $1.4 \times 10^{-2}$ moles of peptizing agent are used in each case.

TABLE

| Peptizing Agent | Amount (phr.) | Hours to Failure |
| --- | --- | --- |
| 3-mercaptopropionic acid | 1.5 | >377 |
| Thiomalic acid | 2.1 | >377 |
| Butyl thioglycolate [1] | 2.2 | 0.2 |
| Thiuram E/Accelerator 552 [2] | 1.25/0.25 | 3.5 |

[1] For comparison only.
[2] Tetraethyl thiuram disulfide/Piperidinium pentamethylene dithiocarbamate; for compariosn only.

One can employ the adhesive formulation of this example at a solids content of as high as 60% solids, unlike most conventional formulations.

Adhesives prepared according to this invention as exemplified above are very resistant to crystallization as evidenced by tack retention for very long periods of time. They exhibit excellent creep resistance and adequate "quick stick" properties without resorting to a heat cure.

If desired, various copolymers within the limits of this invention may be employed in place of the copolymer used above. In place of the isopropanol, methanol and ethanol can be substituted with equivalent results. Amounts of magnesium oxide varying from 1 to 10 parts can be employed and optimum "quick stick" properties obtained. Alternative tackifying resins are the pentaerythritol ester of a super-hydrogenated wood rosin acid, or the ethylene glycol ester.

Without the alcohol-water viscosity stabilization, gellation occurs. Lesser amounts than those employed above will cause greater viscosity due to partial gellation, but until the viscosity becomes objectionably high, they can be employed.

In the preparation of pressure sensitive adhesives as disclosed herein the use of difunctional mercaptans, e.g., ethylene dimercaptan, will cause a rapid increase in viscosity thereby defeating peptization.

In the above example, acid acceptors may be added, e.g., vinyl ethers like isooctyl or cetyl vinyl ether, and allo-ocimene, in amounts of from about 2–16 phr.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. In the method o fpreparation of pressure-sensitive adhesives from a carboxyl-containing chloroprene-sulfur copolymer having about 0.25 to 1 weight percent carboxyl groups, and 0.1 to 2 weight percent sulfur, the improvement of peptizing 100 parts of said polymer by adding (a) a volatile solvent system containing a hydrocarbon solvent and a ketone or ester solvent, (b) a mercapto carboxylic acid of about 2 to 15 carbon atoms, in amounts of about $7 \times 10^{-5}$ to $3 \times 10^{-2}$ moles, and (c) a water $C_1$—$C_4$ alkyl alcohol mixture in an amount sufficient to prevent gellation but not exceed the solubility parameter for the polymer in the solvent system, and after peptizing, adding about 0.1 to 20 parts of magnesium oxide and up to about 200 parts of an oil-soluble phenol-aldehyde resin.

2. The method defined in claim 1 wherein the copolymer contains from 0.25 to 0.6 weight percent carboxyl groups, and 0.4 to 0.8 percent sulfur.

3. The method defined in claim 2 wherein said volatile alcohol is a $C_1$ to $C_4$ alkyl alcohol and the mole ratio of alcohol to water is about 4 to 3.

4. The method defined in claim 2 wherein said aromatic solvent is benzene, toluene or xylene and said ketone or ester is methyl ethyl ketone or ethyl acetate and said solvent system contains up to about one-third its total volume of a votatile paraffinic hydrocarbon solvent.

5. The method defined in claim 2 wherein said peptizing agent is 3-mercaptopropionic acid, thiomalic acid, or thioglycolic acid, about $3.5 \times 10^{-4}$ to $2 \times 10^{-2}$ moles of said mercapto acid being employed.

6. The adhesive prepared by the method of claim 2.

7. The method defined in claim 5 wherein the mercapto acid is 3-mercaptopropionic acid.

8. The method defined in claim 5 wherein the mercapto acid is thiomalic acid.

References Cited

UNITED STATES PATENTS

| | | | |
|---|---|---|---|
| 2,227,517 | 1/1941 | Starkweather et al. | 260—92.3 |
| 2,356,091 | 8/1944 | Roedel | 260—42 |
| 2,382,731 | 8/1945 | Little | 260—755 |
| 3,308,087 | 3/1967 | Garrett | 260—92.3 |

DONALD E. CZAJA, Primary Examiner

W. E. PARKER, Assistant Examiner

U.S. Cl. X.R.

117—122; 266—27, 29.7, 92.3